(12) United States Patent
Yamamoto

(10) Patent No.: US 11,269,062 B2
(45) Date of Patent: Mar. 8, 2022

(54) LASER ILLUMINATION DEVICE AND PERIPHERAL MONITORING SENSOR PROVIDED WITH SAME

(71) Applicant: OMRON CORPORATION, Kyoto (JP)

(72) Inventor: Kazuo Yamamoto, Nara (JP)

(73) Assignee: OMRON Corporation, Kyoto (JP)

( * ) Notice: Subject to any disclaimer, the term of this patent is extended or adjusted under 35 U.S.C. 154(b) by 364 days.

(21) Appl. No.: 16/465,584

(22) PCT Filed: Nov. 16, 2017

(86) PCT No.: PCT/JP2017/041207
§ 371 (c)(1),
(2) Date: May 31, 2019

(87) PCT Pub. No.: WO2018/146889
PCT Pub. Date: Aug. 16, 2018

(65) Prior Publication Data
US 2020/0018827 A1 Jan. 16, 2020

(30) Foreign Application Priority Data

Feb. 13, 2017 (JP) .............................. JP2017-024046

(51) Int. Cl.
*G01S 7/481* (2006.01)
*G01S 17/931* (2020.01)
(Continued)

(52) U.S. Cl.
CPC .......... *G01S 7/4814* (2013.01); *G01S 17/931* (2020.01); *G02B 3/06* (2013.01); *G02B 5/0242* (2013.01);
(Continued)

(58) Field of Classification Search
CPC ........ H01S 3/005; G01S 7/481; G01S 7/4814; G02B 5/0242
See application file for complete search history.

(56) References Cited

U.S. PATENT DOCUMENTS 3,600,063 A * 8/1971 Bowen ................... G02B 1/06
359/626
4,712,884 A * 12/1987 Sakuma ............ G02B 13/0005
359/206.1
(Continued)

FOREIGN PATENT DOCUMENTS

CN 102096176 A 6/2011
CN 104169645 A 11/2014
(Continued)

OTHER PUBLICATIONS

The search report dated May 6, 2020 in a counterpart European patent application.
(Continued)

*Primary Examiner* — Bryon T Gyllstrom
*Assistant Examiner* — Christopher E Dunay
(74) *Attorney, Agent, or Firm* — Metrolex IP Law Group, PLLC

(57) ABSTRACT

A laser illumination device includes a light source component, a micro-element lens, and a meniscus lens. The light source component emits a laser beam. The micro-element lens spreads out the laser beam. The meniscus lens has an incident face on which the laser beam from the micro-element lens is incident, and a light emission face that is provided on the opposite side from the incident surface and includes a convex shape, and the meniscus lens has a negative power for spreading out the incident laser beam from the micro-element lens.

12 Claims, 16 Drawing Sheets

(51) Int. Cl.
*G02B 3/06* (2006.01)
*G02B 5/02* (2006.01)
*G02B 27/09* (2006.01)

(52) U.S. Cl.
CPC ....... *G02B 5/0278* (2013.01); *G02B 27/0916* (2013.01); *G02B 27/0961* (2013.01)

(56) References Cited

U.S. PATENT DOCUMENTS

| | | | |
|---|---|---|---|
| 6,069,748 | A | 5/2000 | Bietry |
| 8,192,030 | B2 | 6/2012 | Mizushima et al. |
| 2004/0196561 | A1* | 10/2004 | Tanaka ............... G02B 27/0961 359/619 |
| 2006/0132903 | A1* | 6/2006 | Shakir ................. G02B 27/108 359/333 |
| 2010/0053565 | A1 | 3/2010 | Mizushima et al. |
| 2010/0231862 | A1* | 9/2010 | Itoh .................... G03B 21/2033 353/31 |
| 2011/0002042 | A1 | 1/2011 | Kuroda et al. |
| 2012/0250331 | A1 | 10/2012 | De Lamberteire |
| 2013/0215636 | A1 | 8/2013 | Angelini et al. |
| 2013/0314711 | A1* | 11/2013 | Cantin .................... G01S 17/10 356/445 |
| 2015/0153018 | A1* | 6/2015 | Lin ......................... F21V 13/04 362/259 |
| 2016/0039333 | A1* | 2/2016 | Shyu .................... F21S 41/675 362/509 |
| 2016/0195615 | A1 | 7/2016 | Tobeta et al. |
| 2016/0313563 | A1 | 10/2016 | Angelini et al. |
| 2017/0351101 | A1 | 12/2017 | Angelini et al. |
| 2018/0011606 | A1 | 1/2018 | Yasui |
| 2018/0172803 | A1* | 6/2018 | Liang .................... G01S 7/4816 |
| 2018/0284276 | A1* | 10/2018 | Campbell ............. G01S 7/4816 |
| 2019/0024862 | A1* | 1/2019 | Kurashige ............. F21S 41/675 |
| 2019/0354234 | A1 | 11/2019 | Yasui |

FOREIGN PATENT DOCUMENTS

| | | |
|---|---|---|
| CN | 104953465 A | 9/2015 |
| CN | 205942057 U | 2/2017 |
| EP | 2256458 A1 | 12/2010 |
| JP | 2008-159348 A | 7/2008 |
| JP | 2011-049233 A | 3/2011 |
| JP | 2012-216542 A | 11/2012 |
| JP | 2014-013357 A | 1/2014 |
| JP | 2015-132666 A | 7/2015 |
| JP | 2016-125925 A | 7/2016 |
| WO | 2008/114502 A1 | 9/2008 |
| WO | 2016/125384 A1 | 8/2016 |

OTHER PUBLICATIONS

The Chinese Office Action ("CNOA") dated Mar. 18, 2020 in a counterpart Chinese Patent application.

An English translation of the International Search Report of a related international application PCT/JP2017/041207 dated Dec. 12, 2017.

The Written Opinion of a related international application PCT/JP2017/041207 dated Dec. 12, 2017.

* cited by examiner

LASER ILLUMINATION DEVICE AND PERIPHERAL MONITORING SENSOR PROVIDED WITH SAME

FIELD

The present invention relates to a laser illumination device and a peripheral monitoring sensor provided with the same.

BACKGROUND

Laser illumination devices in which a laser beam is used as the light source have been used in recent years for the illumination of vehicular peripheral monitoring sensors, and of monitoring sensors that monitor people in hospitals, factories, facilities, and the like.

These laser illumination devices need to enlarge the beam spread of the laser beam and irradiate a wide angle (such as 140 degrees) in order to monitor as wide an area as possible by means of the laser beam emitted from a single light source. For this reason, a diffuser such as a lens array or a diffuser plate for diffusing light, for example, has been used as a means for diffusing laser light.

However, with a configuration in which a diffuser is used, there is a limit to how efficiently the laser beam can be widened.

For example, Patent Literature 1 discloses a laser illumination device comprising a micro-element lens, a light diffusing element, and the like as a configuration for diffusing a laser beam over a wide angle.

CITATION LIST

Patent Literature

Patent Literature 1: WO 2008-114502

SUMMARY

Technical Problem

However, the following problems are encountered with the conventional laser illumination device discussed above.

That is, with the laser illumination device disclosed in the above publication, the laser beam emitted from the laser light source is spread out mainly using the micro-element lens and the light diffusing element, so there is a limit to how wide the irradiation range of the laser beam can be.

Since a laser beam can cause damage when focused on the retina, there are safety standards for laser products. These safety standards have been set for, for example, in JIS C6802 (JIS: Japanese Industrial Standards), IEC60825 (IEC: International Electrotechnical Commission), and FDA1040 (FDA: US Food & Drug Administration).

When a laser illumination device is applied to a vehicular peripheral monitoring sensor, the laser beam irradiates a wide area outdoors, so it needs to have no effect on the human body when used.

The conventional laser illumination device discussed above is installed in a projector or another such image display device, and is configured to project an image on a projection screen via a light modulation element. That is, the goal is to irradiate the projection screen with the laser light, and since it is not assumed that the laser will be directed at a person, no consideration whatsoever is given to the safety of the human eye against the laser light.

It is an object of the present invention to provide a laser illumination device capable of diffusing an emitted laser light over a wider angle and ensuring the safety of the eyes of any people in the vicinity, as well as a peripheral monitoring sensor provided with this device.

Solution to Problem

The laser illumination device according to the first invention comprises a light source component, a micro-element lens, and a lens unit. The light source component emits a laser beam. The micro-element lens spreads out the laser light. The lens unit has an incident face on which the laser beam is incident from the micro-element lens, and an emission face provided on the opposite side from the incident face and including a convex shape, and this lens unit has negative power to spread out the laser beam incident from the micro-element lens.

Here, in a laser illumination device mounted on a peripheral monitoring sensor or the like, for example, laser light emitted from the light source component irradiates a wide angle of 100 degrees or more in a substantially horizontal direction using a micro-element lens and a lens unit, for example, and the apparent size of the light source that forms an image on the retina of a person nearby is increased.

More specifically, a micro-element lens is combined with a lens unit that further expands the laser light that has already been expanded by the micro-element lens so that a wider angle is irradiated, and as a result the laser light is effectively expanded for wide-angle irradiation, which reduces the risk of injuring a person's eyes.

Laser light poses the danger of serious injury to the eyes and skin even at a low power level, and products that use laser light need to be carefully managed for safety. Products in which the effect of laser light on the human body, and especially the eyes, has been eliminated are referred to as "eye-safe."

Here, the laser illumination device of the present invention can be used, for example, in vehicular peripheral monitoring sensors, peripheral monitoring devices for automatic guided vehicles (AGV), and as an illumination device in a variety of apparatuses used to monitor of people in hospitals, factories, facilities, and so forth.

The above-mentioned light source component is, for example, a laser diode (LD) that emits substantially parallel laser light having a specific wavelength (850 nm), and the laser light is expanded via a micro-element lens and a lens unit so that a wide angle can be irradiated.

The above-mentioned micro-element lens is, for example, a lens array including a plurality of micro lenses disposed in the same plane, and spreads out the laser light emitted substantially in parallel from the light source component.

The micro lenses included in the micro-element lens may each consist of a lens having a convex portion with a spherical or an aspherical shape in a cross sectional view parallel to the optical axis, or a cylindrical lens in which the focal distances are different in the X direction and the Y direction in the XY plane perpendicular to the optical axis. In addition, the micro-lenses included in the micro-element lens may be disposed in a plane on the incident side from which the laser light is incident from the light source component, or may be disposed on a convex curved surface on the emission side, or may be disposed on both of these.

The above-mentioned lens unit is a lens having a negative power and having a convex emission face in order to further expand a laser beam that is incident in a state of having been expanded by the micro-element lens, and to irradiate a wider angle. A meniscus lens or the like is used, for example. A plurality of lenses may be combined into a lens group having a negative power, and this lens group may be used as the lens unit.

With the above configuration, using the micro-element lens and the lens unit in combination allows the laser light to be expanded and to irradiate a wide angle of 100 degrees or more, for example. Furthermore, when a lens unit having a convex emission face and a negative power is used, the laser light will be emitted from the entire convex emission face, which makes it less likely that the apparent size of the light source formed on the retina of a person nearby will become smaller, regardless of the angle from which it is viewed.

As a result, it is possible to expand the laser beam more effectively so that it irradiates a wider angle, and to reduce the likelihood of damage to the retina of anyone nearby, thereby ensuring a good level of safety.

The laser illumination device according to the second invention is the laser illumination device according to the first invention, wherein the micro-element lens has a plurality of micro-lenses disposed in the same plane.

Here, a micro-element lens has a plurality of micro-lenses disposed in the same plane.

Consequently, the laser light emitted from the light source component can be expanded before being incident on the lens unit.

The laser illumination device according to the third invention is the laser illumination device according to the second invention, wherein the micro-lenses included in the micro-element lens have a shape in which the curvature of the convex portion is large in a cross sectional view parallel to the optical axis.

Here, lenses having a shape in which the curvature of the convex portion is large are used as the micro-lenses included in the micro-element lens.

Here, saying that the lens has a large curvature of the convex portion means that the lens has a curvature in which the distal end portion in the optical axis direction has a curvature larger than that of the periphery in a cross sectional view parallel to the optical axis.

Consequently, using a micro-element lens including micro-lenses having such an aspherical shape prevents the central portion from being brighter and the periphery darker in the angular intensity distribution of the laser light, and allows the periphery to be made brighter with respect to the center.

As a result, the entire range of irradiation by the laser light can be irradiated with a sufficient amount of laser light, which makes it possible to detect obstacles, people, etc., in the surrounding area with high accuracy, for example.

The laser illumination device according to the fourth invention is the laser illumination device according to the second or third invention, wherein the micro-lenses included in the micro-element lens are cylindrical lenses.

Here, a cylindrical lens having curvature in one direction in a plane parallel to the optical axis and having no curvature in a direction perpendicular to this is used for each of the micro-lenses included in the micro-element lens.

Consequently, when this laser illumination device is used as an illumination device in a sensor for monitoring the periphery of a vehicle, for example, the laser light is expanded and irradiates a wide angle only in a substantially horizontal direction, whereas the laser light is not expanded in a substantially vertical direction.

The laser illumination device according to the fifth invention is the laser illumination device according to any of the first to fourth inventions, wherein the incident face of the lens unit has a concave shape.

Here, a lens unit is used in which the incident face side was formed in a concave shape.

Consequently, the concave incident face of the lens unit can further expand the laser beam that has already been expanded by the micro-element lens to widen the angle, and the convex emission face of the lens unit increases the apparent size of the light source formed on the retina of a person, regardless of the angle from which the light is viewed, which ensures the safety of the eyes of any people in the surrounding area.

The laser illumination device according to the sixth invention is the laser illumination device according to any of the first to fifth inventions, wherein the lens unit is a meniscus lens.

Here, a meniscus lens is used as the lens unit having a convex shape on the emission face side and having negative power.

Consequently, using a meniscus lens having a concave shape on the incident side and a convex shape on the emission side and having a negative power further expands the laser light that is incident from the micro-element lens to widen the angle, and this also ensures the safety of the eyes of any people in the surrounding area.

The laser illumination device according to the seventh invention is the laser illumination device according to any of the first to sixth inventions, further comprising a beam expander that is configured to combine a plurality of lenses disposed between the light source component and the micro-element lens, and that expands the beam diameter of the laser beam emitted from the light source component.

Here, a beam expander is provided between the light source component and the micro-element lens to expand the substantially parallel laser light emitted from the light source component into substantially parallel light whose beam diameter has been expanded.

Here, the beam expander is constituted, for example, by a first lens for expanding the substantially parallel laser light emitted from the light source component, and a second lens for converting the laser light expanded by the first lens back into substantially parallel laser light.

Consequently, the beam diameter of the laser beam can be expanded to be incident on the micro-element lens while the beam remains substantially parallel, so that the laser light can more effectively irradiate a wide angle, and the apparent size of the light source formed on the retina of a person can be increased.

Also, as described above, the addition of a beam expander increases the beam diameter of the laser beam incident on the micro-element lens. Accordingly, when a given irradiation range (angle) is irradiated with a laser beam, the optical path length can be shortened and the optical system can be more compact.

The laser illumination device according to the eighth invention is the laser illumination device according to any of the first to the seventh inventions, wherein the micro-element lens includes diffusion particles that spread out the incident laser beam.

Here, a micro-element lens that includes diffusion particles is used.

Consequently, in addition to the diffusion effect attributable to the shape of the lens, the diffusion effect of the diffusion particles can also be obtained, allowing the light to be more effectively expanded for irradiation over a wide angle.

Also, since the laser light diffusion effect in the micro-element lens is increased, when the laser light irradiates a given irradiation range (angle), the curvature of the convex emission face of the lens unit disposed on the downstream side can be decreased.

The laser illumination device according to the ninth invention is the laser illumination device according to any of the first to eighth inventions, wherein the lens unit includes diffusion particles that spread out the incident laser beam.

Here, a lens unit including diffusion particles is used.

Consequently, in addition to the diffusion effect attributable to the shape of the lens, the diffusion effect of the diffusion particles can also be obtained, and the laser beam incident on the lens unit can be expanded more effectively and can irradiate a wider angle.

The laser illumination device according to the tenth invention is the laser illumination device according to any of the first to ninth inventions, further comprising a diffuser that is disposed between the micro-element lens and the lens unit and spreads out the incident laser beam.

Here, a diffuser that spreads out the incident laser light is disposed between the micro-lens and the lens unit.

The shape of the diffuser here may be, for example, a plate shape, or may be spherical or cuboid.

Consequently, the laser light emitted from the micro-element lens can be further expanded in the diffuser, after which it can be incident on the lens unit.

As a result, the laser beam emitted from the micro-element lens can be further expanded to be incident on the lens unit, so that the laser beam can more effectively irradiate over a wide angle.

Also, as described above, when a diffuser is added, the laser beam incident via the lens unit irradiates an even wider angle. Accordingly, when a laser beam irradiates a given irradiation range (angle), the curvature of the convex emission face of the lens unit disposed on the downstream side can be decreased.

The laser illumination device according to the eleventh invention comprises a light source component, a lens unit, and a micro-element lens. The light source component emits a laser beam. The lens unit has an incident face on which the laser beam is incident from the light source component, and an emission face provided on the opposite side from the incident face and including a convex shape, and the lens unit has negative power to spread out the laser beam. The micro-element lens has a plurality of micro-lenses disposed on the emission face of the lens unit and spreads out the laser beam.

Here, with a laser illumination device mounted on a peripheral monitoring sensor or the like, for example, laser light emitted from the light source component irradiates a wide angle of 100 degrees or more in a substantially horizontal direction, for example, using the lens unit and the micro-element lens, and the apparent size of the light source formed on the retina of anyone in the surrounding area is increased.

More specifically, the lens unit that expands the laser beam emitted from the light source component to widen the angle is combined with the micro-element lens that has a plurality of micro-lenses disposed on the emission face of the lens unit to further expand the laser beam, so the laser beam irradiates a wide angle and the risk of injury to human eyes is reduced.

With regard to so-called eye-safe products which prevent the apparent size of the light source formed on the retina of the human eye from becoming smaller, these are defined under the above-mentioned IEC 60825 or the like, as a safety standard for laser products.

Here, the laser illumination device of the present invention can be used, for example, in vehicular peripheral monitoring sensors, peripheral monitoring devices for automatic guided vehicles (AGV), and as an illumination device in a variety of apparatuses used to monitor of people in hospitals, factories, facilities, and so forth.

The above-mentioned light source component is, for example, a laser diode (LD) that emits substantially parallel laser light having a specific wavelength (850 nm), and the laser light is expanded via a micro-element lens and a lens unit so that a wide angle can be illuminated.

The above-mentioned lens unit is a lens having a negative power and having a convex emission face in order to further expand a laser beam that is incident in a state of having been expanded by the micro-element lens, and to irradiate a wider angle. A meniscus lens or the like is used, for example. A plurality of lenses may be combined into a lens group having a negative power, and this lens group may be used as the lens unit.

The above-mentioned micro-element lens is, for example, a lens array including a plurality of micro lenses disposed on the emission face of the lens unit, and further spreads out the laser light by the lens unit having negative power. In addition, the micro lenses included in the micro-element lens may each consist of a lens having a convex portion with a spherical or an aspherical shape in a cross sectional view parallel to the optical axis, or a cylindrical lens, anamorphic lens, or the like in which the focal distances are different in the X direction and the Y direction in the XY plane perpendicular to the optical axis.

With the above configuration, a lens unit and a micro-element lens are used in combination, which allows the laser beam to be expanded and to irradiate a wide angle of 100 degrees or more, for example. Furthermore, using a lens unit that has a convex emission face and has a negative power results in laser light being irradiated from the entire micro-element lens disposed on the emission face including a convex shape, so it is less likely that the apparent size of the light source formed on the retina of a person nearby will become smaller, regardless of the angle from which it is viewed.

As a result, the laser beam can be expanded more effectively and irradiate a wider angle, and it is possible to reduce the damage to the retina any people in the surrounding area and thereby ensure better safety.

The peripheral monitoring sensor according to a twelfth invention comprises the laser illumination device according to any of the first to eleventh inventions, a light receiver, and a detector. The light receiver receives reflected light of the laser beam emitted from the laser illumination device, from a plurality of directions. The detector detects surrounding objects on the basis of the amount and direction of the reflected light received by the light receiver.

Here, a peripheral monitoring sensor is configured to comprise the above-mentioned laser illumination device, a light receiver that receives reflected light of the laser beam from a plurality of directions, and a detector that detects surrounding objects (obstacles, people, etc.) on the basis of the amount and direction of the reflected light.

Here, an image sensor or the like that receives the reflected light of the laser beam emitted from the laser illumination device can be used as the light receiver, for example.

Consequently, the above configuration makes it possible to obtain a peripheral monitoring sensor capable of more effectively expanding the emitted laser light so that it irradiates a wider angle, and ensuring the safety of the eyes of people in the surrounding area.

Advantageous Effects

With the laser illumination device according to the present invention, the emitted laser beam can be more effectively expanded and can irradiate a wider angle, and the safety of the eyes of any people in the surrounding area can be ensured.

DETAILED DESCRIPTION

Embodiment 1

The laser illumination device according to an embodiment of the present invention is described below with reference to FIGS. 1 to 9B.

The laser illumination device 10 according to this embodiment is mounted in a vehicular peripheral monitoring sensor 100 featuring a TOF (time of flight) method. A sensor that employs the TOF method measures the distance to an object from how long it takes for the reflected light of projected light to be received (the flight time of light).

Figure 1:
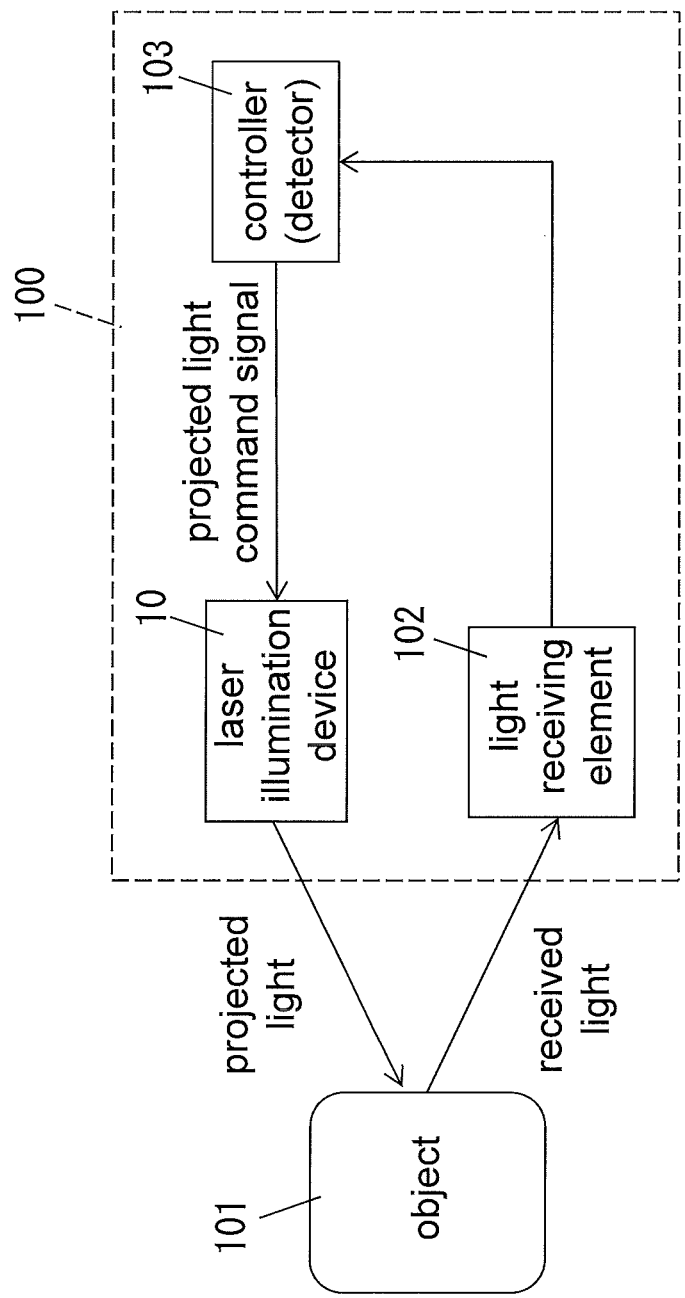
FIG. 1 is a diagram of the configuration of a peripheral monitoring sensor in which the laser illumination device according to an embodiment of the present invention is mounted.
Figure 2:
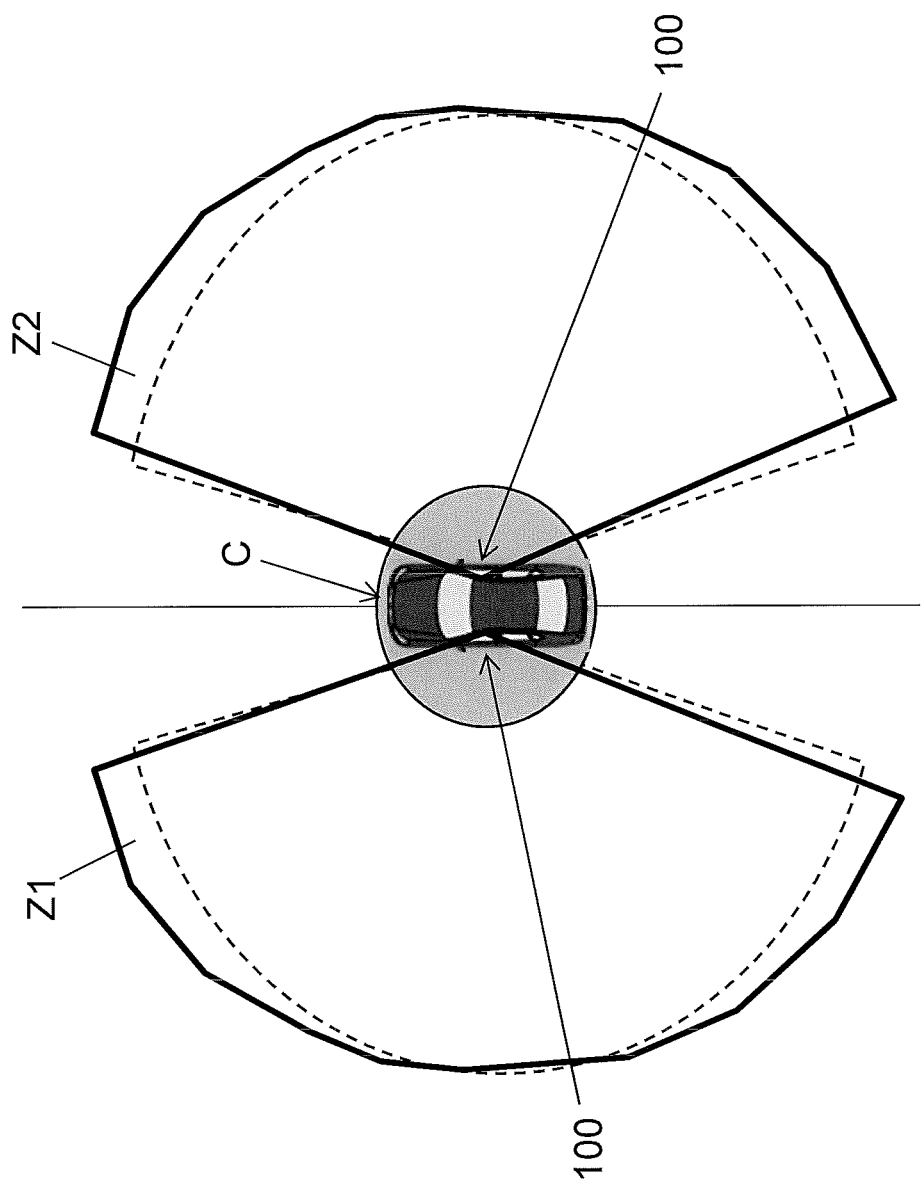
FIG. 2 is a plan view of the range of laser light emitted from the peripheral monitoring sensor in FIG. 1.

As shown in FIG. 1, the peripheral monitoring sensor 100 includes the laser illumination device 10, a light receiving element 102, and a controller (detector) 103. As shown in FIG. 2, a peripheral monitoring sensor 100 is provided on each side of a vehicle C, and these sensors monitor whether there are any obstacles, people, or the like by irradiating laser light irradiation ranges Z1 and Z2 of approximately 140 degrees on the left and right sides of the vehicle C with laser beams B1, for example.

The laser illumination device 10 is installed for illumination of the peripheral monitoring sensor 100, and is controlled by the controller 103. The laser illumination device 10 receives a light projection command signal from the controller 103, and irradiates a wide angle over the desired range (about 140 degrees) with the laser beam B1. The detailed configuration of the laser illumination device 10 will be described below.

After being emitted from the laser illumination device 10, the laser beam B1 hits an object 101, and the reflected light is received by the light receiving element 102. The light receiving element 102 then transmits data, such as the amount of reflected light that was received, to the controller 103.

A CMOS (complementary MOS) image sensor is used as the light receiving element 102, which receives a plurality of beams of reflected light. In addition, arrayed PDs (photo diodes), APDs (avalanche photo diodes), or SPADs (single photon avalanche diodes) may be used as the image sensor. Also, the light receiving element 102 is configured to allow calculation of the direction in which the plurality of beams of reflected light are incident based on the position on the image sensor where the light is received, by appropriate geometric design.

The controller 103 determines that the light received by the light receiving element 102 is reflected light of the laser light B1 on the basis of the change in the amount of this light. The controller 103 can also calculate the distance to a nearby object on the basis of how long it takes to receive the reflected light of the laser beam B1 emitted from the laser illumination device 10, and determine whether there is an obstacle, a person, or the like in the vicinity.

Furthermore, the controller 103 determines the type and position of an object located nearby by analyzing a plurality of sets of three-dimensional point group data obtained on the basis of the incidence direction of the received reflected light and the calculated distance to the nearby object.

Laser Illumination Device 10

Figure 3:
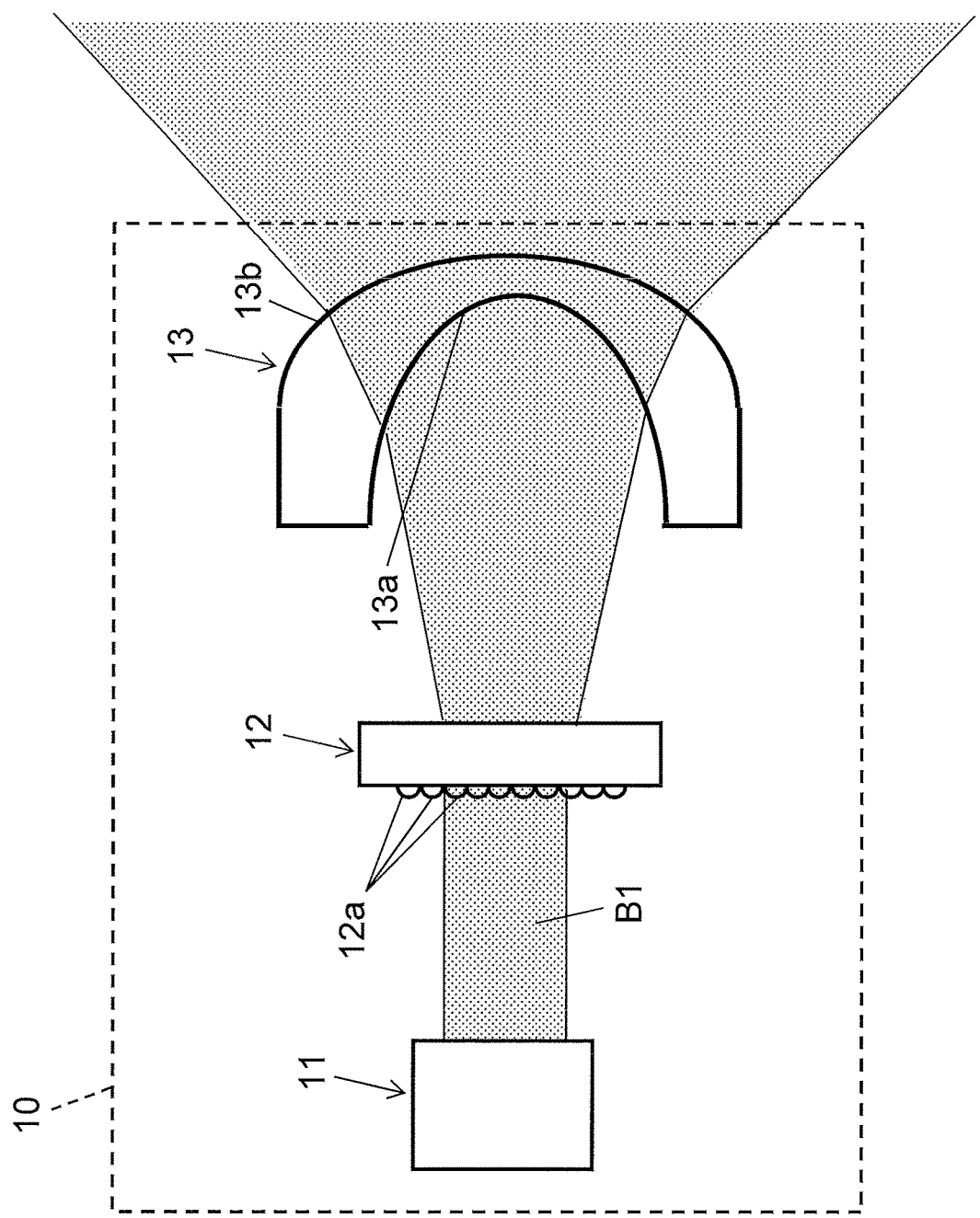
FIG. 3 is a plan view of the simplified configuration of the laser illumination device mounted to the peripheral monitoring sensor in FIG. 1.

The laser illumination device 10 in this embodiment is installed as an illumination device for the above-mentioned peripheral monitoring sensor 100, and irradiates a wide angle on the left and right side surfaces of the vehicle C with the laser beam B1. As shown in FIG. 3, the laser illumination device 10 comprises a light source component 11, a micro-element lens 12, and a meniscus lens (lens unit) 13.

Light Source Component 11

The light source component 11 emits a laser beam substantially parallel to the micro-element lens 12. In addition, a laser diode (LD) or the like that emits a laser beam with excellent energy concentration and directivity can be used as the light source component 11.

Micro-Element Lens 12

The micro-element lens 12 is provided between the light source component 11 and the meniscus lens 13 as shown in FIG. 3 in order to scatter the laser light B1 incident from the light source component 11 and irradiate a wide angle. The micro-element lens 12 is molded from a resin having a relatively high refractive index. Also, as shown in FIG. 4A, the micro-element lens 12 is configured such that a plurality of micro-lenses 12a are continuously disposed in the same plane on the light source component 11 side (the side where the laser beam B1 is incident).

The micro-element lens 12 includes, for example, a lens array, a cylindrical lens array, or the like constituted by a plurality of the micro-lenses 12a.

Figures 4A, 4B:
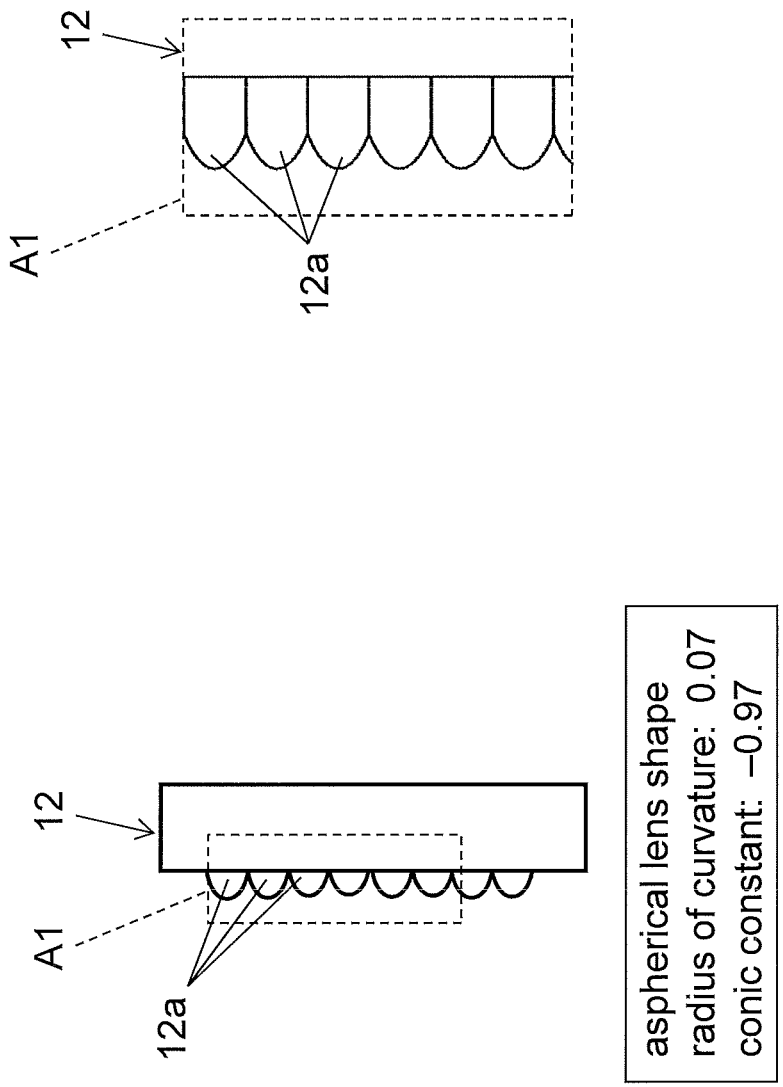
FIG. 4A is a side view of the configuration of the micro-element lens included in the laser illumination device in FIG. 3.
FIG. 4B is a detail view of the A1 portion in FIG. 4A.

As shown in FIG. 4B, the micro-lenses 12a have a convex portion in cross section, in which the distal end part in the optical axis direction has a curvature greater than the surrounding portion in a cross sectional view parallel to the optical axis. The radius of curvature is 0.07, and the conic constant is −0.97.

Figure 5A:
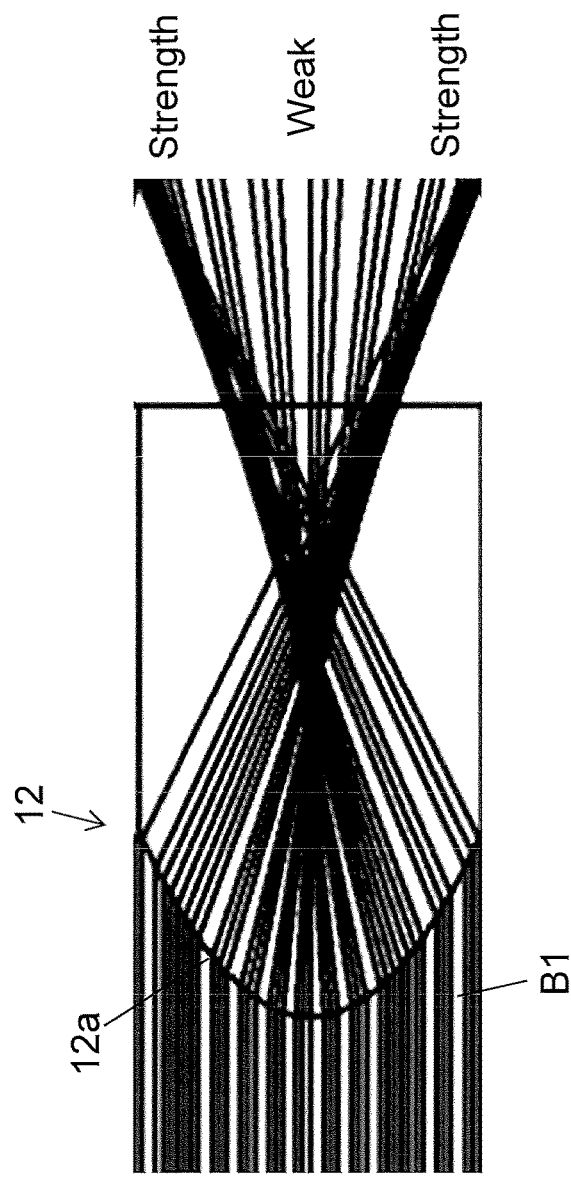
FIG. 5A is a cross section of the micro-lenses constituting the micro-element lens in FIGS. 4A and 4B, and shows the laser light that passes through the convex part with a large curvature in cross sectional view.

The result of giving the convex portion of the micro-lens 12a an aspherical shape with a large curvature is that, as shown in FIG. 5A, the angular intensity distribution of the laser beam B1 that has passed through the micro-element lens 12 can be distributed such that the peripheral part is stronger than the central part.

Figure 5B:
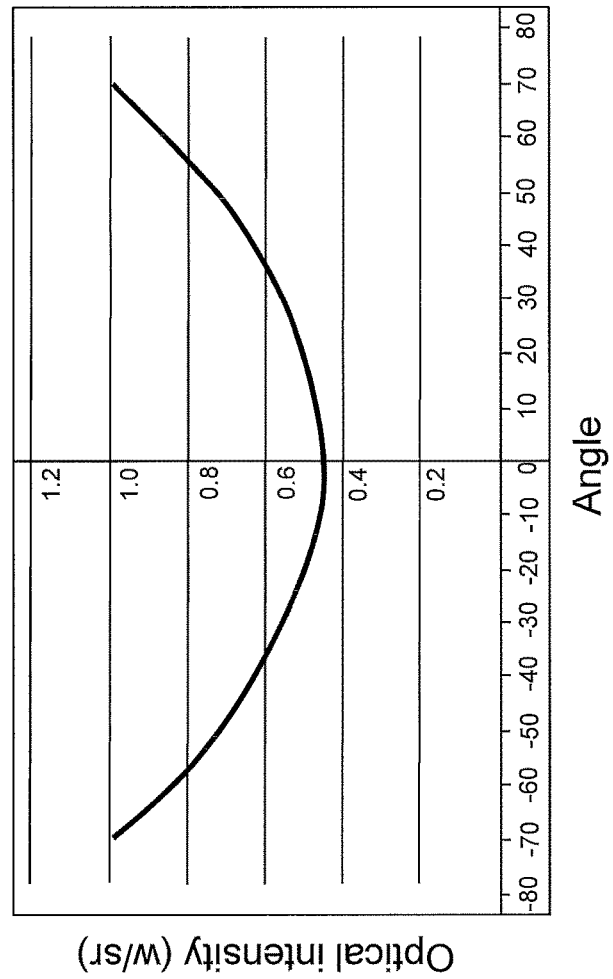
FIG. 5B is a graph of the light intensity distribution of the laser beam that has passed through the micro-lenses in FIG. 5A.

More specifically, with the laser illumination device 10 in this embodiment, as shown in FIG. 5B, the laser beam B1 that has passed through the micro-element lens 12 has a light intensity that gradually increases moving away from the center with respect to the light intensity of the central part (about 0.43 w/sr), with the light intensity reaching its maximum (about 1.0 w/sr) at 70 degrees to the left and right.

That is, in this embodiment, the use of the micro-element lens 12 including the micro-lenses 12a having a convex portion with a curvature that is greater at the distal end part in the optical axis direction than that of the peripheral part in a cross sectional view parallel to the optical axis allows irradiation with the laser light B1 such that the intensity on the outside of the irradiation range (the side with a larger angle) is greater than that in the center.

As a result, a laser beam B1 with a sufficient light quantity can irradiate all the way to the outside range in the irradiation range of the laser beam B1, as opposed to a conventional micro-element lens in which the intensity distribution is highest in the central part and weakens toward the outside. Thus, the peripheral monitoring sensor 100 can detect obstacles, people, and the like in the surrounding area with high accuracy.

Meniscus Lens 13

Figure 6:
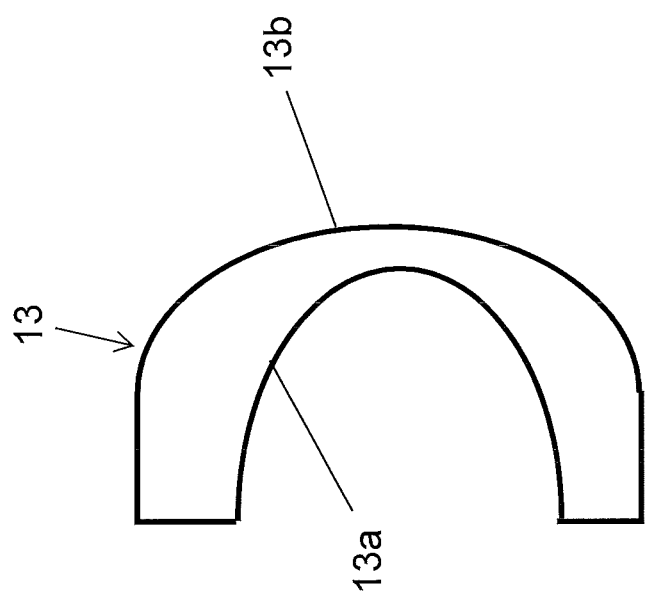
FIG. 6 is a side view of the configuration of a meniscus lens included in the laser illumination device in FIG. 3.

The meniscus lens 13 has a negative power as a whole in order to further expand and widen the angle of the laser beam that has already been expanded by the micro-element lens 12, and is disposed on the emission side of the micro-element lens 12 as shown in FIG. 3. As shown in FIG. 6, the meniscus lens 13 has a concave incidence face 13a on which the laser beam B1 emitted from the micro-element lens 12 is incident, and a convex emission face 13b from which the expanded laser beam B1 is emitted.

More precisely, the incidence face 13a of the meniscus lens 13 has an aspherical concave shape with a radius of curvature of 15 mm and a conic constant of −0.89. The emission face 13b of the meniscus lens 13 has a hemispherical shape with a radius of curvature of 60 mm.

In this embodiment, the meniscus lens 13 has the concave aspherical incidence face 13a on the micro-element lens 12 side and the convex emission face 13b having a large curvature on the opposite side, and the lens as a whole has a negative power. Consequently, the laser beam B1 that is incident after passing through the micro-element lens 12 can be further expanded to irradiate a wider angle with the laser beam. Therefore, as shown in FIG. 7, the laser beam B1 can irradiate a wide angle of 100 degrees or more (such as 140 degrees).

Also, in this embodiment, the use of the meniscus lens 13 having the convex emission face 13b allows eye safety to be ensured no matter from which angle the laser beam B1 emitted from the emission face 13b of the meniscus lens 13 is viewed.

Figure 7:
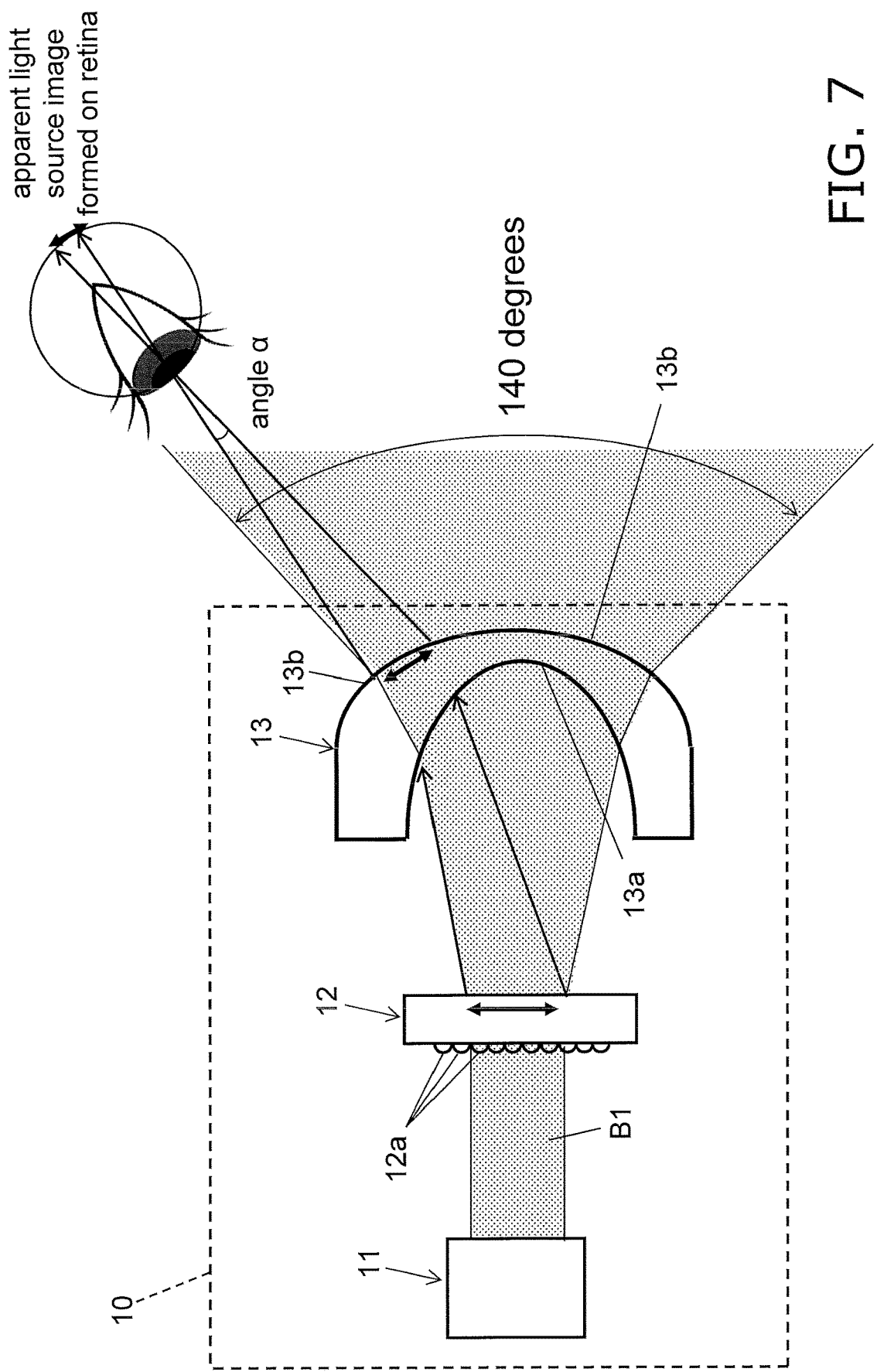
FIG. 7 is a plan view of a state in which laser light emitted from the laser illumination device in FIG. 3 is expanded and irradiates a wide angle, and the apparent size of the light source formed on the retina of a person in the surrounding area is enlarged.

More specifically, as shown in FIG. 7, the laser beam B1 emitted from the emission face 13b of the meniscus lens 13 forms an image on the retina of the eye of a person in the surrounding area. At this time, if the viewing angle α decreases, such as when looking at an angle, for example, the apparent size of the light source formed on the retina may decrease to the point that the retina is damaged.

In view of this, with the laser illumination device 10 in this embodiment, the meniscus lens 13 having the convex emission face 13b is used.

Figure 8:
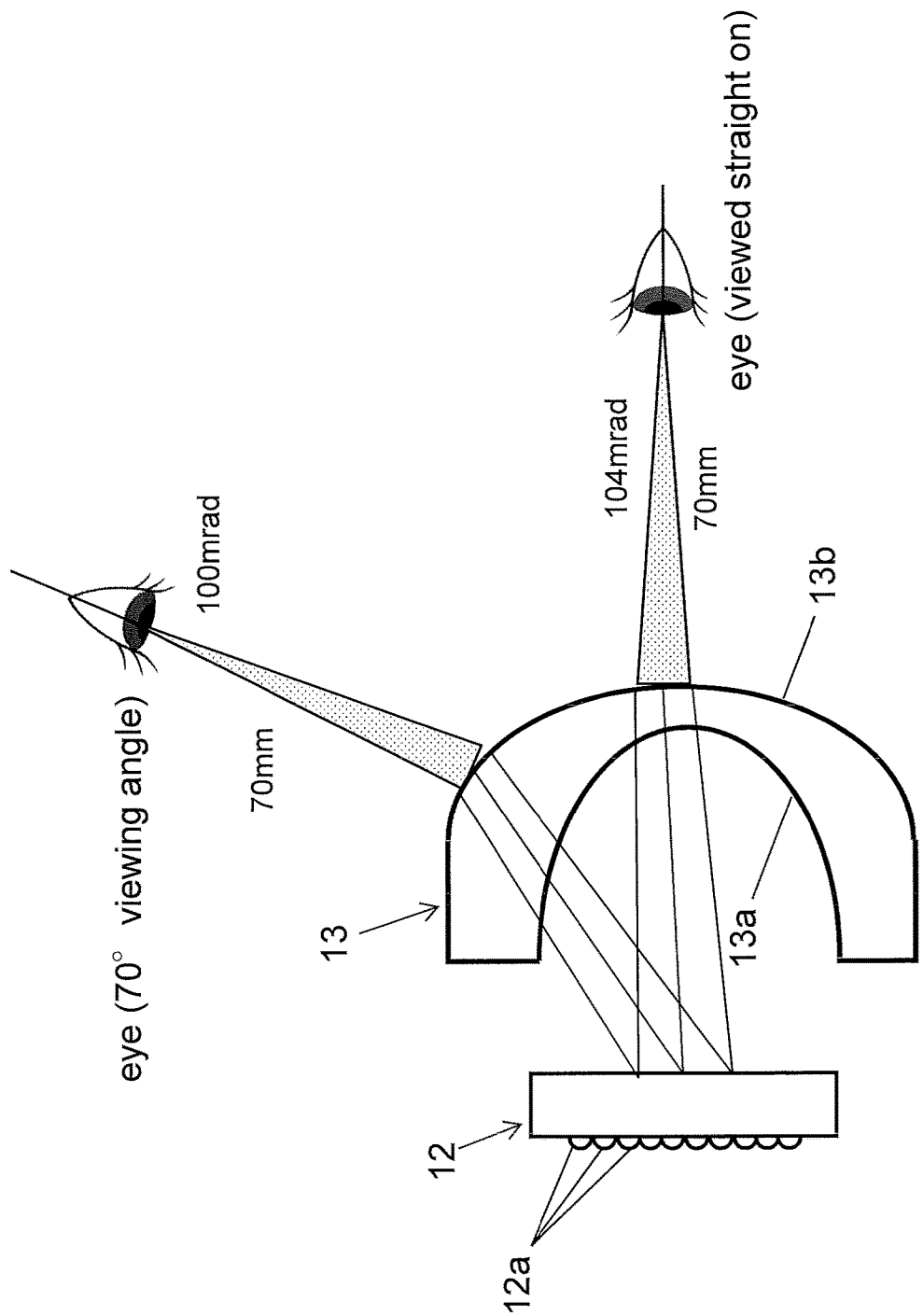
FIG. 8 is a conceptual view showing that laser light which has passed through the meniscus lens and the micro-element lens constituting the laser illumination device in FIG. 3 is at or below a specific accessible emission limit, regardless of the angle from which it is viewed.

Consequently, as shown in FIG. 8, if a nearby person should look at the laser beam B1, regardless of the angle, the viewing angle of the laser beam B1 entering the eye can be raised to 100 mrad or more. This ensures safety of the eyes of any people in the surrounding area.

More specifically, the viewing angle of the laser beam B1 entering the eye when viewed from the front of the laser illumination device 10 was 104 mrad, and the viewing angle of the laser beam B1 entering the eye when viewed from an angle of 70 degrees from the front was 100 mrad (5.73 degrees). That is, the angle of the laser beam B1 entering the eye as seen from any angle can be raised to 100 mrad or more.

As a result, the apparent size of the light source formed on the retina can be increased enough to prevent the laser beam B1 from damaging the retina.

Because of the above, making the emission face 13b of the meniscus lens 13 a convex shape with a curvature larger than that of a spherical surface allows the laser beam B1 to irradiate a wide angle in a state in which the apparent size of the light source when viewed from an angle has been increased so that safety of human eyes is ensured.

IEC (International Electro-technical Commission) 60825 uses the value of the viewing angle considered to be safe as a standard to define the maximum viewing angle αmax, which is the value of the viewing angle of an apparent light source at which MPE and AEL become independent of the size of the light source at a size above this standard.

That is, since the allowable light reception amount per unit of surface area of the retina of the human eye is a constant value, the allowance light amount can be increased by increasing the apparent size (area) of the light source formed on the retina.

The above can be explained from values calculated by simulation.

Figure 9A:
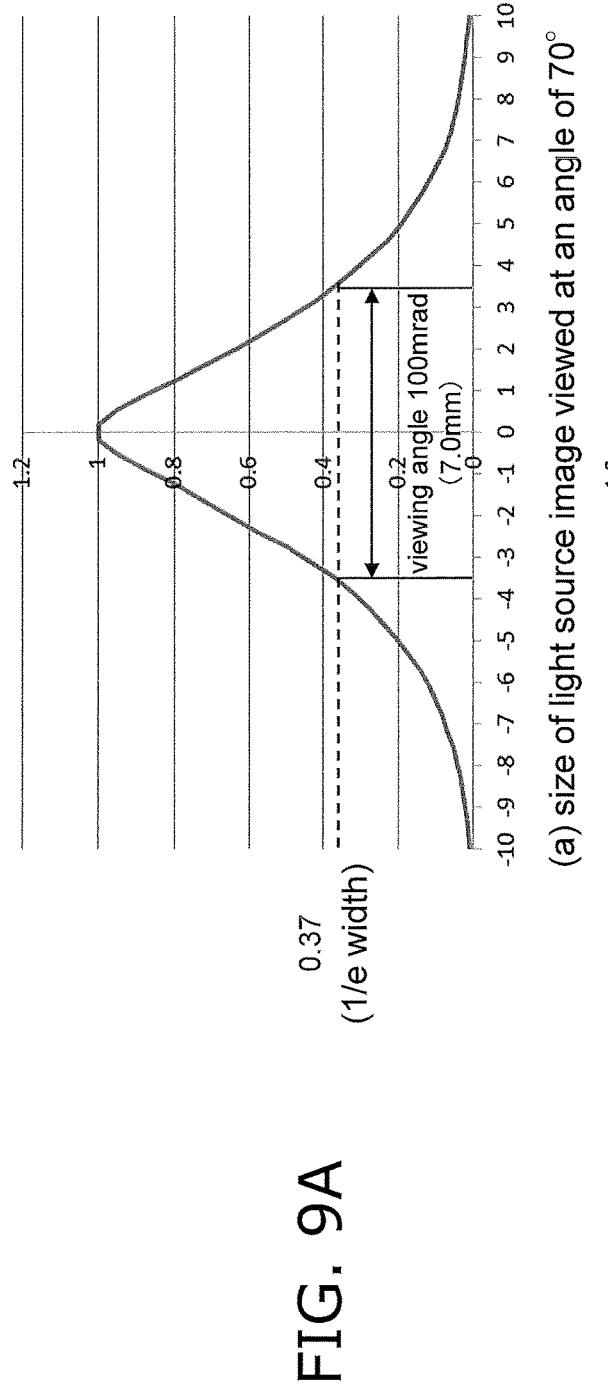
FIG. 9A is a graph of the apparent size of the light source as seen at an angle of 70 degrees as shown in FIG. 8.
Figure 9B:
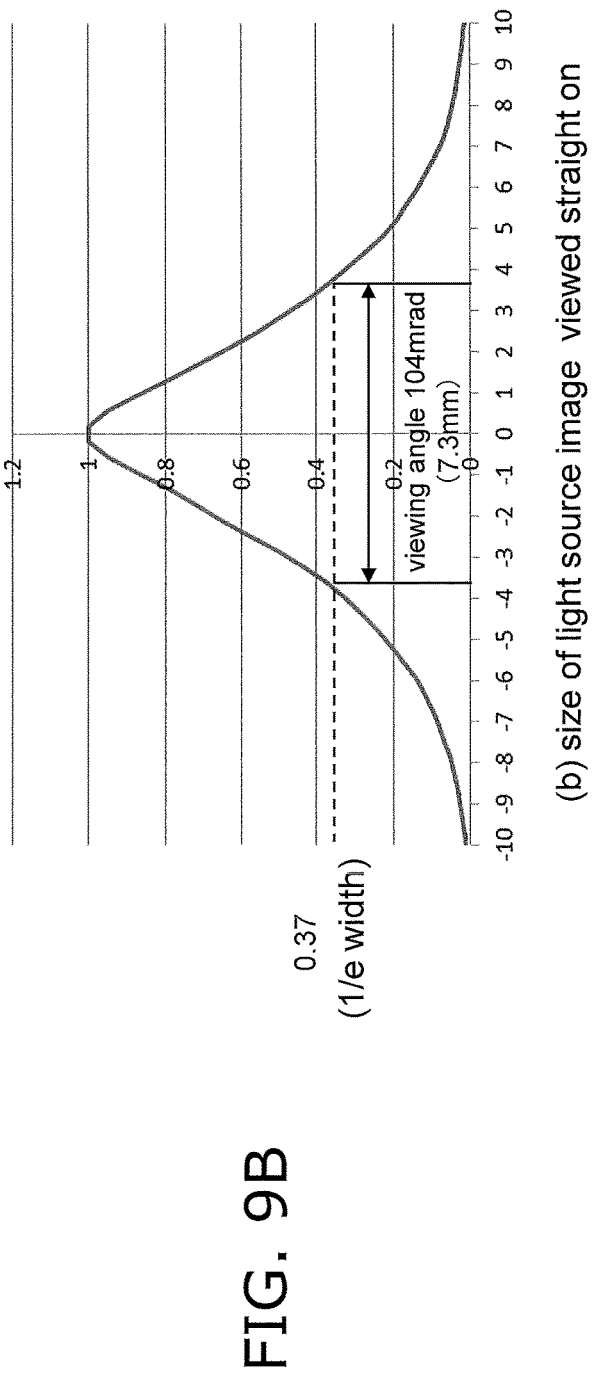
FIG. 9B is a graph of the apparent size of the light source as seen from the front shown in FIG. 8.

FIGS. 9A and 9B show the energy distribution of the light source image formed on the emission face 13b of the meniscus lens 13 by the laser light B1 converged at the position of the eye after going through the micro-element lens 12 and the meniscus lens 13, when the laser illumination device 10 in this embodiment is viewed from the two positions shown in FIG. 8. Since the energy distribution of laser light can be regarded as a Gaussian distribution, the diameter at which the energy reaches 1/e (e is the base of a natural logarithm) of the central peak value of the distribution corresponds to the beam diameter of the laser light. FIG. 9A shows when the laser beam B1 is viewed at an angle of 70 degrees, and the beam diameter (the size of the light source image) at which the energy reaches 1/e of the central peak value is 7.0 mm.

Here, since the distance between the laser illumination device 10 and the eye is set to 70 mm, the viewing angle is 100 mrad. Similarly, FIG. 9B shows when the laser beam B1 is viewed from the front, the beam diameter at which the energy reaches 1/e of the central peak value is 7.3 mm, and the viewing angle is 104 mrad.

The meniscus lens 13 is a cylindrical lens having curvature in one direction (the substantially horizontal direction) in a plane parallel to the optical axis, and having no curvature in a direction perpendicular to the first direction (the substantially vertical direction).

That is, in this embodiment, the use of a cylindrical lens as the meniscus lens 13 affords a configuration in which the laser beam B1 angle is increased only in the substantially horizontal direction in which the periphery is monitored, and the angle of the laser beam B1 is not increased in the substantially vertical direction.

It is also possible for there to be curvature in a substantially perpendicular direction, as needed.

Main Features

With the laser illumination device 10 in this embodiment, the combined use of the micro-element lens 12 and the meniscus lens 13 as described above allows the laser beam B1 to irradiate a wide angle of 140 degrees, as shown in FIG. 7.

Furthermore, the above combination allows the laser beam B1 to be emitted from the entire convex emission face 13b of the meniscus lens 13.

That is, with the laser illumination device 10 in this embodiment, because the concave meniscus lens 13 is disposed on the emission side of the micro-element lens 12, the laser beam B1 and can be spread out over a wider angle in two stages in the micro-element lens 12 and the meniscus lens 13.

As a result, the laser beam B1 can be expanded and irradiate a wide angle more effectively than in the past, and the laser beam B1 can be prevented from damaging the retina by increasing the apparent size of the light source formed on the retina no matter from which angle α person in the surrounding area views the laser beam B1.

Furthermore, with this embodiment, an aspherical lens that is pointed and has a large curvature of the convex portion is used as the micro-lenses 12a that constitute the micro-element lens 12.

Consequently, a laser beam B1 can be emitted in which the intensity on the outside of the irradiation range (the side with a larger angle) is greater than that of the central part. As a result, a laser beam B1 with a sufficient light quantity can irradiate all the way to the outside range in the irradiation range of the laser beam B1, as opposed to a conventional micro-element lens in which the intensity distribution is highest in the central part and weakens toward the outside.

Embodiment 2

The laser illumination device according to Embodiment 2 of the present invention will now be described through reference to FIG. 10.

Figure 10:
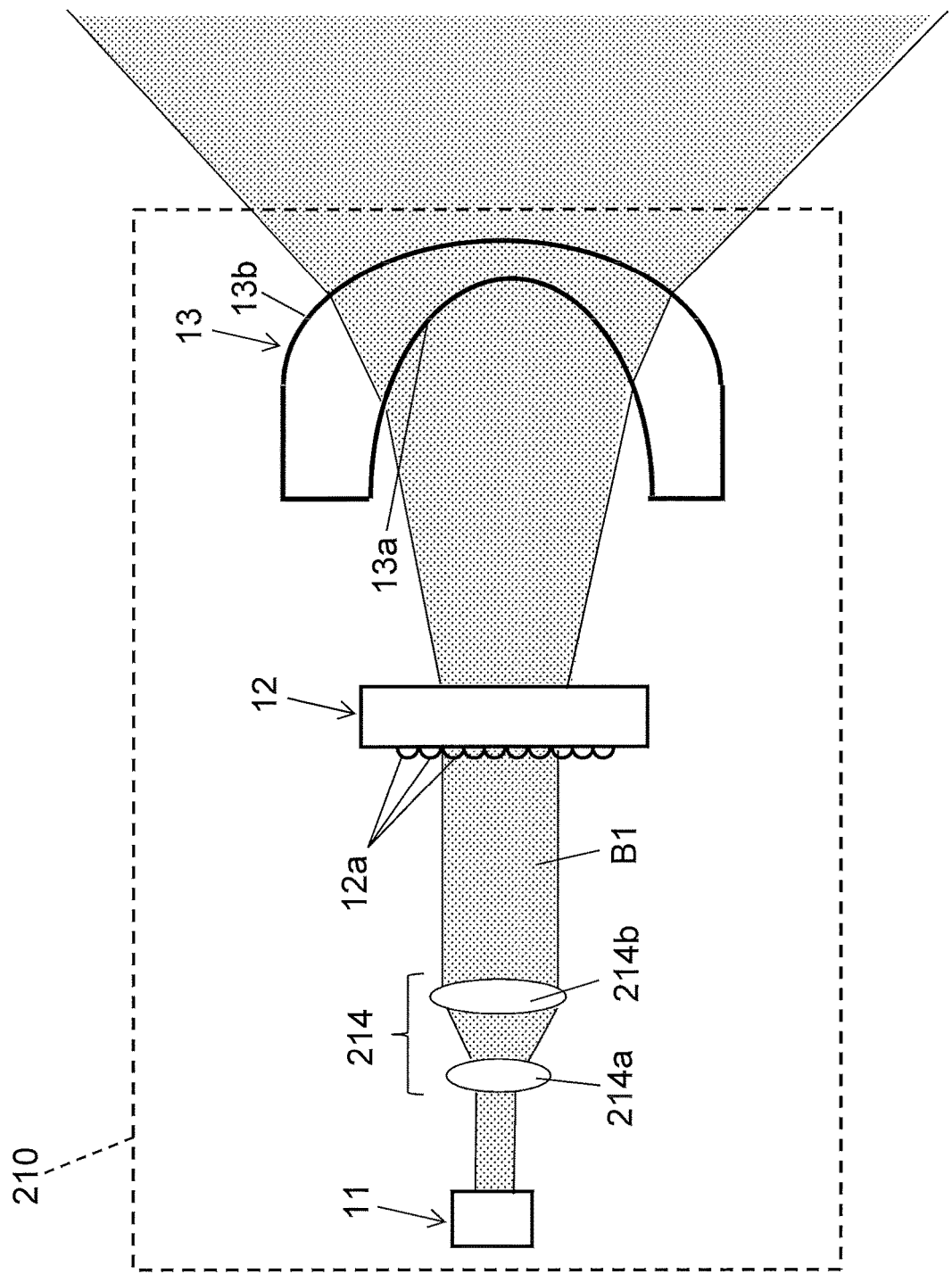
FIG. 10 is a plan view of the simplified configuration of the laser illumination device according to Embodiment 2 of the present invention.

As shown in FIG. 10, the laser illumination device 210 according to this embodiment differs from the laser illumination device 10 of Embodiment 1 above in that a beam expander 214 for expanding the beam diameter of the laser beam B1 is provided between the light source component 11 and the micro-element lens 12.

The rest of the configuration of the laser illumination device 210 is the same as that of the laser illumination device 10 in Embodiment 1, so that configuration will not be described again in detail.

As shown in FIG. 10, the beam expander 214 is made up of a combination of a number of lenses in order to expand the beam diameter of the laser beam B1 emitted from the light source component 11. More specifically, the beam expander 214 has a first lens 214a and a second lens 214b.

The first lens 214a is a convex lens that is disposed on the light source component 11 side and expands the laser beam B1 emitted from the light source component 11.

The second lens 214b is a convex lens that is disposed on the micro-element lens 12 side and collimates the laser beam B1 expanded by the first lens 214a.

Consequently, the beam diameter of the laser beam B1 emitted from the light source component 11 can be increased (collimated) by the beam expander 214, and the laser beam B1 can be made incident on the micro-element lens 12.

As a result, when the laser light B1 irradiates a predetermined wide angle, the optical system can be made more compact by shortening the distance (the optical path length) between the micro-element lens 12 and the meniscus lens 13. When the optical path length is constant and the laser beam B1 irradiates a predetermined wide angle, the curvature of the meniscus lens 13 can be reduced.

Embodiment 3

The laser illumination device according to Embodiment 3 of the present invention will now be described through reference to FIG. 11.

Figure 11:
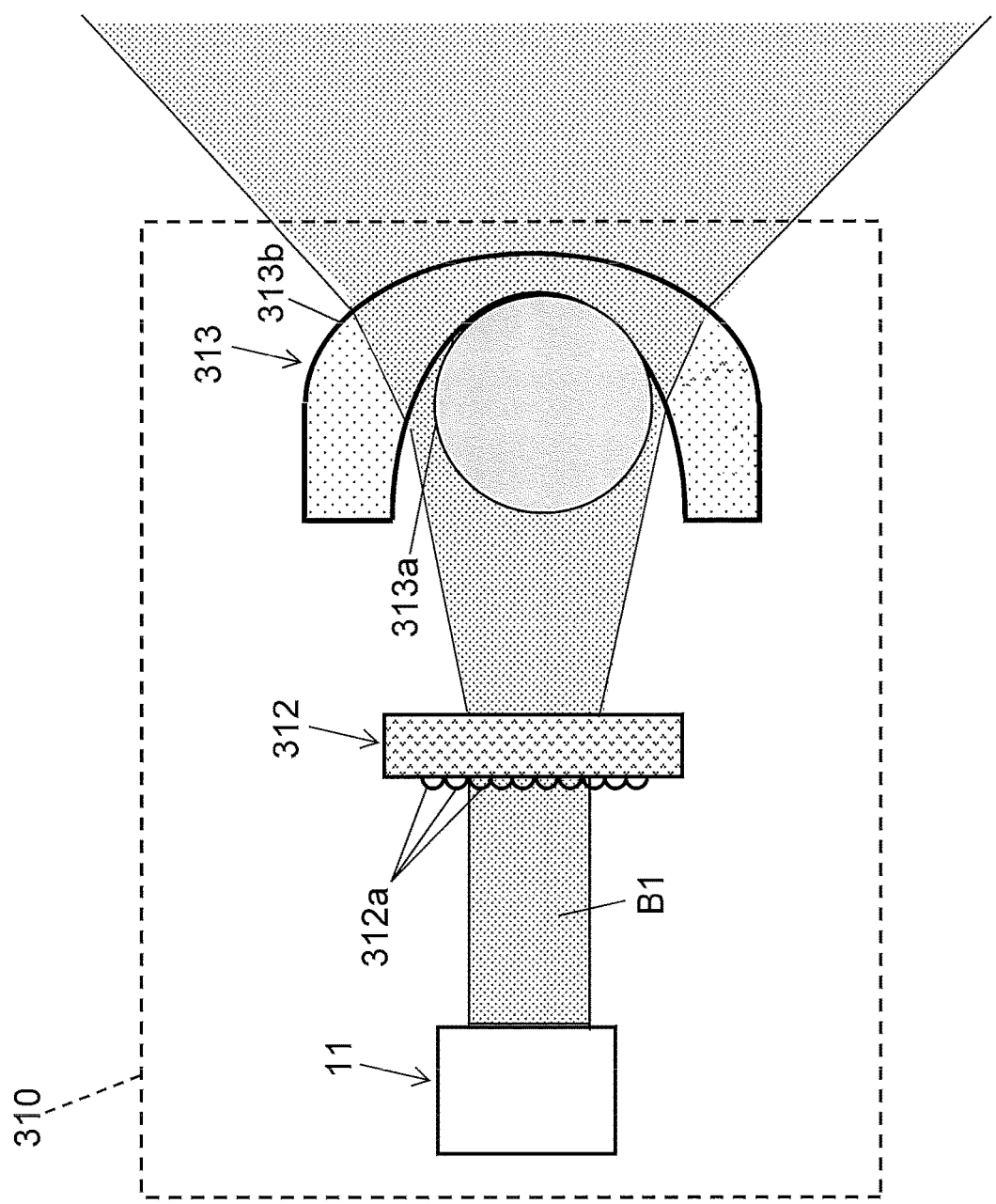
FIG. 11 is a plan view of the simplified configuration of the laser illumination device according to Embodiment 3 of the present invention.

The laser illumination device 310 according to this embodiment differs from Embodiments 1 and 2 in that it includes a micro-element lens 312 and a meniscus lens 313 formed by mixing diffusion particles, as shown in FIG. 11.

The rest of the configuration of the laser illumination device 310 is the same as that of the laser illumination device 10 in Embodiment 1, and will not be described again in detail.

With the laser illumination device 310 in this embodiment, as mentioned above, diffusion particles are mixed in during molding to form the micro-element lens 312 and the meniscus lens 313.

Consequently, the effect of the diffusion particles mixed into the micro-element lens 312 and the meniscus lens 313 is that the laser light B1 passing through the micro-element lens 312 and the meniscus lens 313 is effectively expanded, thereby enhancing the uniformity of the energy distribution, and that wide-angle illumination can be performed while increasing the apparent size of the light source formed on the retina of anyone in the surrounding area.

Since the diffusion particles can be expected to have the effect of spreading out the laser beam B1, the laser beam B1 can irradiate a wide angle just as in Embodiment 1 even if the curvature of the convex portion of the meniscus lens is reduced, for example.

Embodiment 4

The laser illumination device according to Embodiment 4 of the present invention will now be described through reference to FIG. 12.

Figure 12:
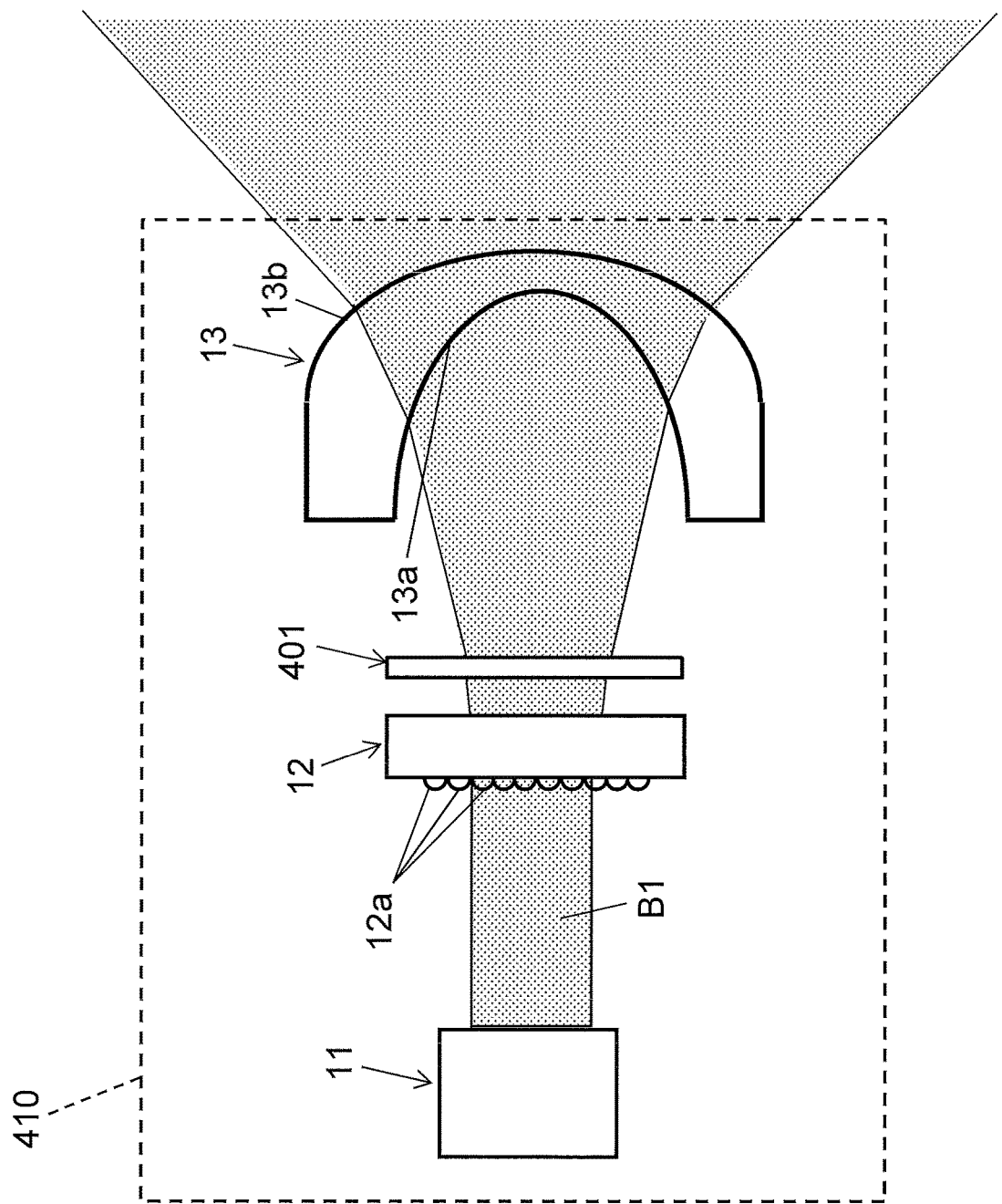
FIG. 12 is a plan view of the simplified configuration of the laser illumination device according to Embodiment 4 of the present invention.

As shown in FIG. 12, the laser illumination device 410 according to this embodiment differs from Embodiment 1 in that a plate-like diffuser 401 containing diffusion particles is disposed between the micro-element lens 12 and the meniscus lens 13.

The rest of the configuration of the laser illumination device 410 is the same as that of the laser illumination device 10 according to Embodiment 1, and will not be described again in detail.

With the laser illumination device 410 in this embodiment, as mentioned above, the diffuser 401 into which diffusion particles have been mixed during molding is disposed between the micro-element lens 312 and the meniscus lens 313.

Consequently, the effect of the diffusion particles mixed into the diffuser 401 is that the laser beam B1 which has passed through the micro-element lens 312 before being incident can be spread out before being incident on the meniscus lens 313. Therefore, the laser beam B1 is effectively spread out to increase the uniformity of the energy distribution, and at the same time, the apparent size of the light source formed on the retina of anyone in the surrounding area can be increased while a wide angle is irradiated.

Since the diffuser 401 can be expected to spread out the laser beam B1, the laser beam B1 can irradiate a wide angle just as in Embodiment 1 even if the curvature of the convex portion of the meniscus lens is reduced, for example.

Embodiment 5

The laser illumination device according to Embodiment 5 of the present invention will now be described through reference to FIG. 13.

Figure 13:
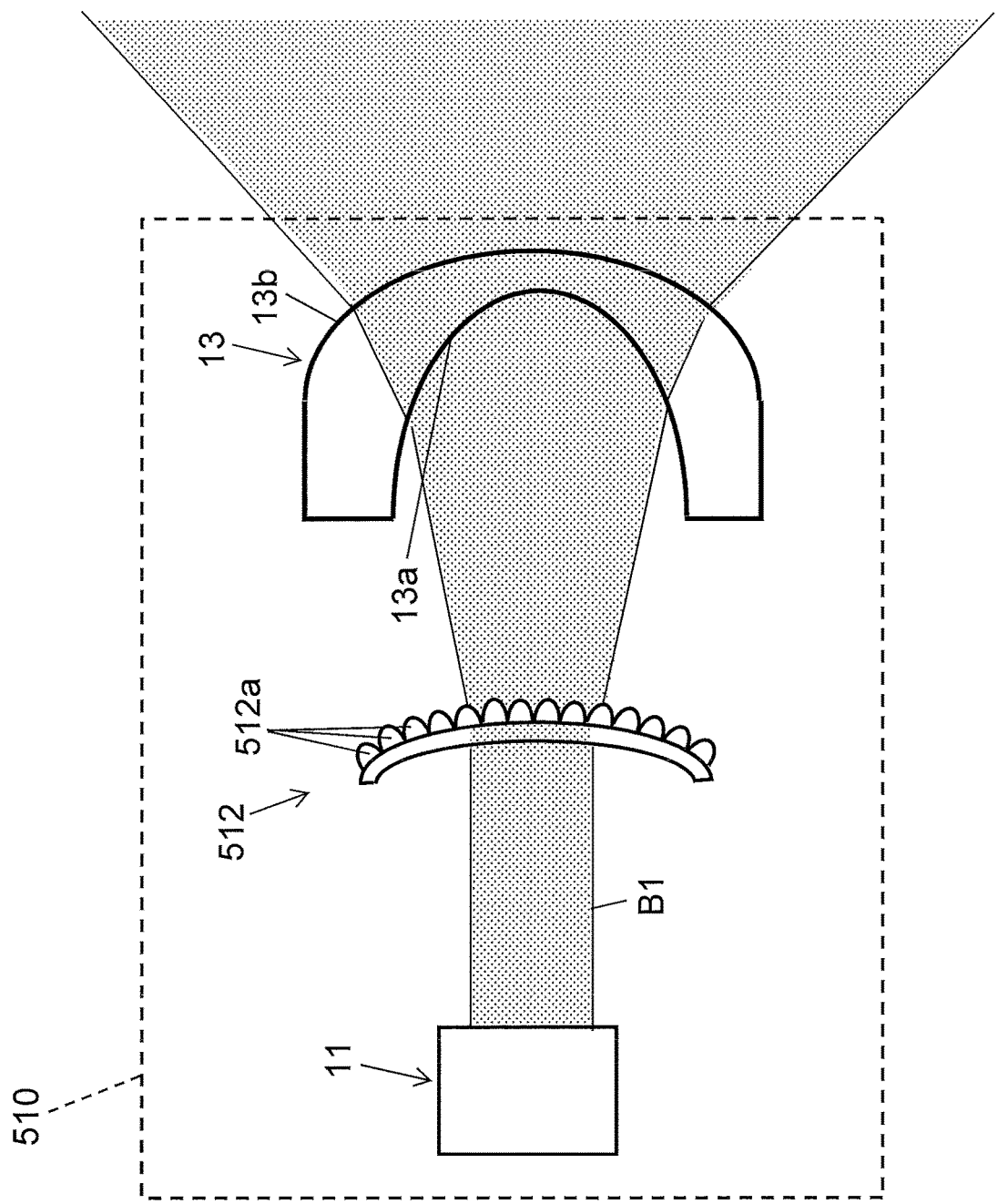
FIG. 13 is a plan view of the simplified configuration of the laser illumination device according to Embodiment 5 of the present invention.

As shown in FIG. 13, the laser illumination device 510 according to this embodiment differs from the configurations of Embodiments 1 to 4, which featured the micro-element lens 12 in which the micro-lenses 12a were disposed in a plane, in that a micro-element lens 512 is used in which a plurality of micro lenses 512a are disposed on a curved surface.

The rest of the configuration of the laser illumination device 510 is the same as that of the laser illumination device 10 according to Embodiment 1, and will not be described again in detail.

With the laser illumination device 510 in this embodiment, the use of the micro-element lens 512, in which a plurality of micro-lenses 512a are disposed on a curved surface on the emission face side, yields the same effect as that of the above embodiments, namely, that the laser light B1 is effectively spread out, thereby enhancing the uniformity of energy distribution, a wide angle can be irradiated while increasing the apparent size of the light source formed on the retina of anyone in the surrounding area, and so forth.

Embodiment 6

The laser illumination device according to Embodiment 7 of the present invention will now be described through reference to FIG. 14.

Figure 14:
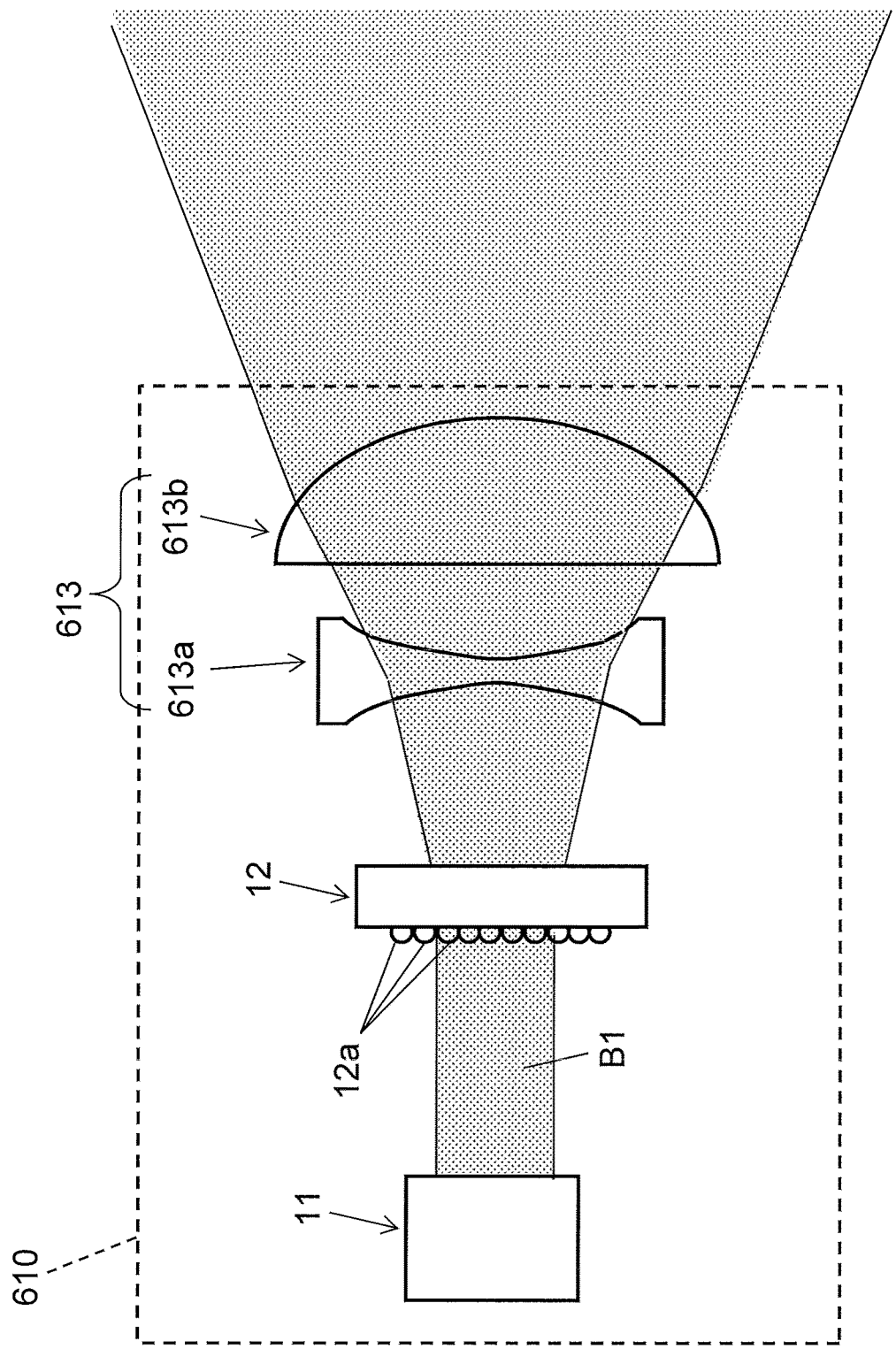
FIG. 14 is a plan view of the simplified configuration of the laser illumination device according to Embodiment 6 of the present invention.

As shown in FIG. 14, the laser illumination device 610 according to this embodiment differs from Embodiment 1, etc., in which a single meniscus lens 13 is used, in that a lens group 613 in which two lenses are combined is used as a lens unit having a convex emission face and having a negative power overall.

The rest of the configuration of the laser illumination device 610 is the same as that of the laser illumination device 10 according to Embodiment 1, and will not be described again in detail.

As mentioned above, with the laser illumination device 610 according to this embodiment uses, the lens group 613 in which two lenses are combined is used as the lens unit.

The lens group 613 has a negative power overall, and as shown in FIG. 14, is made up of a combination of two lenses: a third lens 613a and a fourth lens 613b.

In this embodiment, in order to give the lens group 613a negative power overall, at least one face, on the incident side and/or the emission side, of the third lens 613a is concave.

The fourth lens 613b is formed so that its face on the emission side is convex. The face on the incident side of the fourth lens 613b is formed by a plane substantially perpendicular to the optical axis.

The face on the incident side of the fourth lens 613b may be formed in a convex shape.

The lens group 613 is such that light can be further scattered by the concave aspherical face of the third lens 613a, and the viewing angle α when viewed obliquely can be increased (the apparent light diffusion face size can be increased) by the convex shape of the emission side of the fourth lens 613b.

Consequently, the use of the lens group 613 combining a plurality of lenses (the third and fourth lenses 613a and 613b) as an alternative to the meniscus lens yields the same effect as that of the above embodiments, namely, that the laser beam B1 is effectively expanded to enhance the uniformity of energy distribution, a wide angle can be irradiated while increasing the apparent size of the light source formed on the retina of anyone in the surrounding area, and so forth.

Embodiment 7

The laser illumination device according to Embodiment 7 of the present invention will now be described through reference to FIG. 15.

Figure 15:
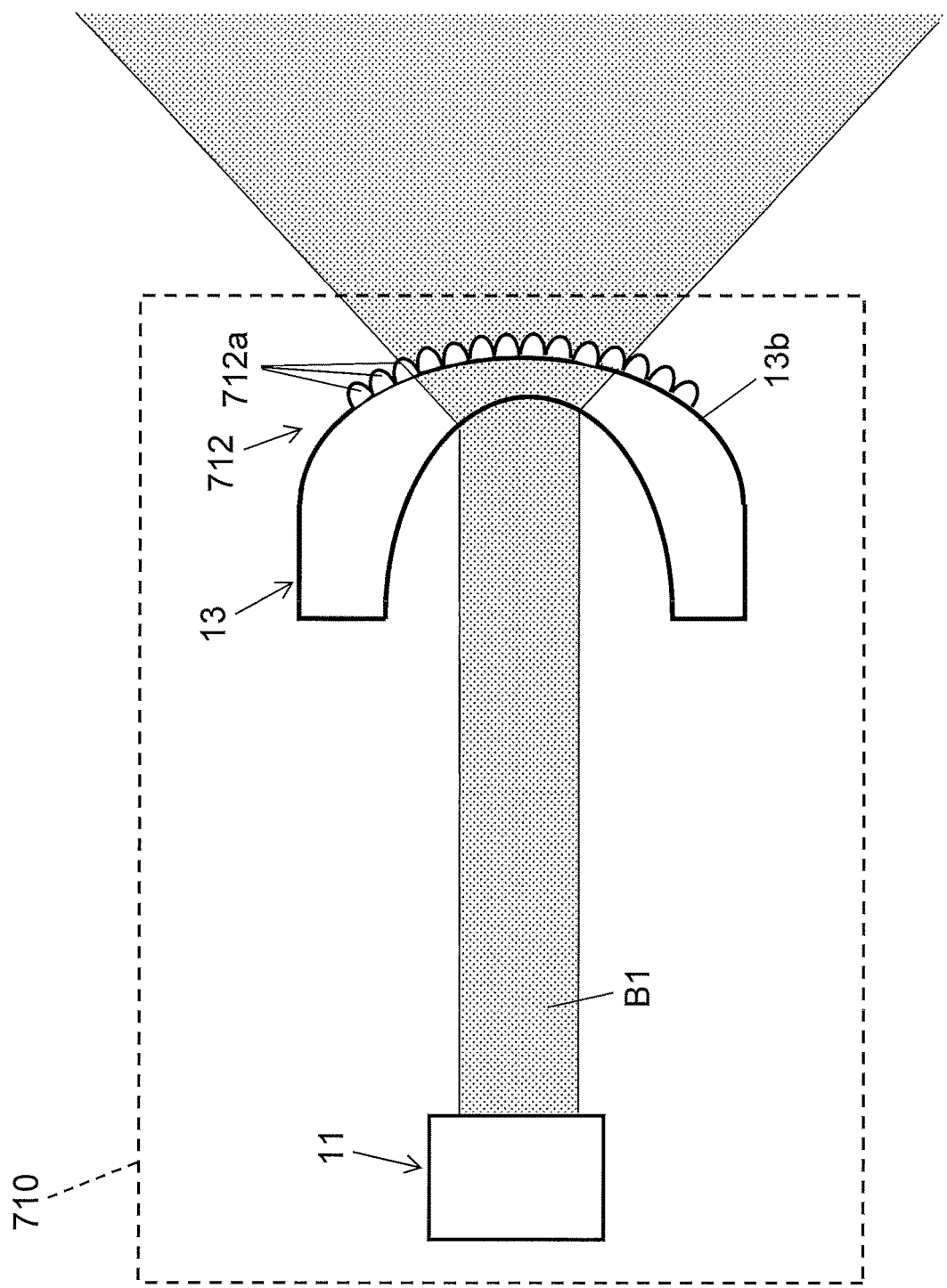
FIG. 15 is a plan view of the simplified configuration of the laser illumination device according to Embodiment 7 of the present invention.

The laser illumination device 710 according to this embodiment differs from Embodiment 1, etc., in that a micro-element lens 712 is disposed on the emission face 13b of the meniscus lens 13 as shown in FIG. 15.

The rest of the configuration of the laser illumination device 710 is the same as that of the laser illumination device 10 according to Embodiment 1, and will not be described again in detail.

With the laser illumination device 710 in this embodiment, as shown in FIG. 15, the micro-element lens 712 is constituted by a plurality of micro-lenses 712a disposed on the emission face 13b side of the meniscus lens 13.

Consequently, this yields the same effect as that of the above embodiments, namely, that the laser light B1 emitted from the light source component 11 can be effectively expanded by the meniscus lens 13 and the micro-element lens 712 to irradiate a wide angle, and eye safety is ensured by increasing the apparent size of the light source formed on the retina of anyone in the surrounding area.

OTHER EMBODIMENTS

Embodiments of the present invention were described above, but the present invention is not limited to or by these embodiments, and various changes are possible without departing from the gist of the invention.

(A)

In Embodiment 1, as shown in FIG. 4B, etc., an example was given in which the micro-element lens 12 included in the laser illumination device 10 was configured to have a plurality of micro-lenses 12a in which the curvature at the distal ends in the optical axis direction in a cross sectional view parallel to the optical axis is greater than that at the periphery. However, the present invention is not limited to this.

Figure 16B:
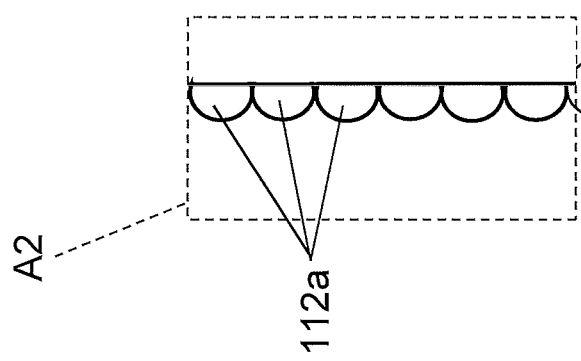
FIG. 16B is a detail view of the A2 portion in FIG. 16A.
Figure 16A:
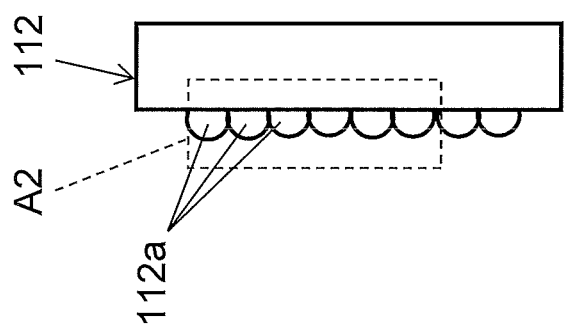
FIG. 16A is a side view of the configuration of the micro-element lens included in the laser illumination device according to another embodiment of the present invention.

For example, as shown in FIGS. 16A and 16B, the laser illumination device may include a micro-element lens 112 in which a plurality of micro-lenses 112a whose curvature is greater at their distal ends in the optical axis direction in a cross sectional view parallel to the optical axis than at the periphery are disposed in planar form.

Here again, combining the micro-element lens 112 and the meniscus lens 13 affords the same effect as above, namely, that the laser beam B1 can irradiate a wider angle than conventionally, and the safety of the eyes of any people in the surrounding area can be ensured.

(B)

In the above embodiments, as shown in FIG. 3, etc., an example was given in which the laser beam B1 was emitted in substantially parallel form from the light source component 11. However, the present invention is not limited to this.

For example, a light source component that emits a laser beam having a spread may be used.

(C)

In Embodiment 3, as shown in FIG. 11, an example was given in which diffusion particles were mixed into both the micro-element lens 312 and the meniscus lens 313. However, the present invention is not limited to this.

For example, the diffusion particles may be mixed into either the micro-element lens or the meniscus lens 313.

Here again, the added diffusion particles expand the laser beam that passes through them, allowing a wider angle to be irradiated.

(D)

In Embodiment 4, as shown in FIG. 12, an example was given in which the plate-like diffuser 401 was disposed between the micro-element lens 12 and the meniscus lens 13. However, the present invention is not limited to this.

For example, the shape of the diffuser is not limited to that of a plate, and a block-shaped diffuser may be used instead.

(E)

In Embodiment 5, as shown in FIG. 13, an example was given in which the micro-lenses 512a disposed on the curved surface of the micro-element lens 512 were is disposed on the emission face side (the meniscus lens 13 side). However, the present invention is not limited to this.

For example, instead of the configuration shown in FIG. 13, the configuration may be such that the micro-lenses are disposed on the curved surface on the incident side.

(F)

In the above embodiments, as shown in FIG. 2, an example was given in which the present invention was applied to the laser illumination device 10 that was installed in the peripheral monitoring sensor 100, which was mounted in a passenger car or other such vehicle. However, the present invention is not limited to this.

For example, the present invention may be applied to a laser illumination device that is installed in a peripheral monitoring sensor installed in an AGV (automatic guided vehicle) used in a factory or the like, or in a surveillance sensor that monitors people in a factory, a hospital, a facility, a home, or the like.

INDUSTRIAL APPLICABILITY

The laser illumination device of the present invention has the effect of allowing the emitted laser light to be spread out more effectively for wide-angle irradiation, and ensuring the safety of the eyes of any people in the surrounding area, and as such can be broadly applied to various kinds of laser illumination device.

REFERENCE SIGNS LIST 10 laser illumination device
11 light source component
12 micro-element lens
12a micro-lens
13 meniscus lens (lens unit)
13a incident face
13b emission face
100 peripheral monitoring sensor
101 object (obstacle or person)
102 light receiving element
103 controller (detector)
112 micro-element lens
112a micro-lens
210 laser illumination device
214 beam expander
214a first lens
214b second lens
310 laser illumination device
312 micro-element lens
312a micro-lens
313 meniscus lens (lens unit)
313a incident face
313b emission face
401 diffuser
410 laser illumination device
510 laser illumination device
512 micro-element lens
512a micro-lens
610 laser illumination device
613 lens unit (lens unit)
613a third lens
613b fourth lens
710 laser illumination device
712 micro-element lens
712a micro-lens
B1 laser beam
C vehicle
Z1, Z2 laser beam irradiation range

The invention claimed is:

1. A laser illumination device, comprising:
a light source component configured to emit a laser beam;
a micro-element lens configured to spread out the laser beam; and
a lens unit comprising an incident face on which the laser beam is incident from the micro-element lens, and an emission face provided on an opposite side from the incident face and including a convex shape, the lens unit having negative power to spread out the laser beam incident from the micro-element lens.

2. The laser illumination device according to claim 1, wherein the micro-element lens comprises a plurality of micro-lenses disposed in a same plane.

3. The laser illumination device according to claim 2, wherein the micro-lenses included in the micro-element lens have a shape in which a curvature of a convex portion is large in a cross sectional view parallel to an optical axis.

4. The laser illumination device according to claim 2, wherein the micro-lenses included in the micro-element lens are cylindrical lenses.

5. The laser illumination device according to claim 1, wherein the incident face of the lens unit has a concave shape.

6. The laser illumination device according to claim 1, wherein the lens unit comprises a meniscus lens.

7. The laser illumination device according to claim 1, further comprising a beam expander that is configured to combine a plurality of lenses disposed between the light source component and the micro-element lens, and configured to expand the beam diameter of the laser beam emitted from the light source component.

8. The laser illumination device according to claim 1, wherein the micro-element lens includes diffusion particles configured to spread out the incident laser beam.

9. The laser illumination device according to claim 1, wherein the lens unit includes diffusion particles configured to spread out the incident laser beam.

10. The laser illumination device according to claim 1, further comprising a diffuser disposed between the micro-element lens and the lens unit, the diffuser configured to spread out the incident laser beam.

11. A peripheral monitoring sensor, comprising:
the laser illumination device according to claim 1;
a light receiver configured to receive reflected light of the laser beam emitted from the laser illumination device, from a plurality of directions; and
a detector configured to detect surrounding objects on the basis of an amount and direction of the reflected light received by the light receiver.

12. A laser illumination device, comprising:
a light source component configured to emit a laser beam;
a lens unit comprising an incident face on which the laser beam is incident from the light source component, and an emission face provided on an opposite side from the incident face and including a convex shape, the lens unit having negative power to spread out the laser beam; and
a micro-element lens having a plurality of micro-lenses disposed on the emission face of the lens unit, the micro-element lens configured to spread out the laser beam.

* * * * *